(12) United States Patent
Seo et al.

(10) Patent No.: US 10,926,241 B2
(45) Date of Patent: Feb. 23, 2021

(54) CARBON DIOXIDE ADSORBENTS

(71) Applicants: Arizona Board of Regents on behalf of Arizona State University, Scottsdale, AZ (US); Farid Akhtar, Lulea (SE)

(72) Inventors: Dong-Kyun Seo, Chandler, AZ (US); Farid Akhtar, Lulea (SE)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/318,270

(22) PCT Filed: Jun. 12, 2015

(86) PCT No.: PCT/US2015/035492
§ 371 (c)(1),
(2) Date: Dec. 12, 2016

(87) PCT Pub. No.: WO2015/191962
PCT Pub. Date: Dec. 17, 2015

(65) Prior Publication Data
US 2017/0173555 A1    Jun. 22, 2017

Related U.S. Application Data

(60) Provisional application No. 62/011,270, filed on Jun. 12, 2014.

(51) Int. Cl.
*B01J 20/18* (2006.01)
*B01J 20/28* (2006.01)
(Continued)

(52) U.S. Cl.
CPC .............. *B01J 20/18* (2013.01); *B01D 53/02* (2013.01); *B01J 20/186* (2013.01);
(Continued)

(58) Field of Classification Search
None
See application file for complete search history.

(56) References Cited

U.S. PATENT DOCUMENTS 3,558,273 A    1/1971   Beck
4,374,232 A    2/1983   Davis
(Continued)

FOREIGN PATENT DOCUMENTS

CN        102351213         2/2012
CN        106573847 A1      4/2017
(Continued)

OTHER PUBLICATIONS

Liong, M. et al., "Antimicrobial activity of silver nanocrystals encapsulated in mesoporous silica nanoparticles", Advanced Materials, 2009, vol. 21, pp. 1684-1689.
(Continued)

*Primary Examiner* — Christopher P Jones
*Assistant Examiner* — Phillip Y Shao
(74) *Attorney, Agent, or Firm* — Fish & Richardson P.C.

(57) ABSTRACT

A carbon dioxide adsorbent including a hierarchical zeolite. The hierarchical zeolite defines micropores having a pore width between about 0.4 nm and about 2 nm, and at least one of: mesopores having a pore width between about 2 nm and about 50 nm; and macropores having a pore width greater than about 50 nm.

20 Claims, 9 Drawing Sheets

(51) Int. Cl.
*B01D 53/02* (2006.01)
*B01D 53/047* (2006.01)
*B01D 53/04* (2006.01)

(52) U.S. Cl.
CPC ..... *B01J 20/28002* (2013.01); *B01J 20/2808* (2013.01); *B01J 20/28083* (2013.01); *B01J 20/28085* (2013.01); *B01D 53/047* (2013.01); *B01D 53/0462* (2013.01); *B01D 2253/108* (2013.01); *B01D 2253/1085* (2013.01); *B01D 2253/308* (2013.01); *B01D 2257/504* (2013.01); *B01D 2257/80* (2013.01); *B01D 2258/0283* (2013.01); *B01D 2258/05* (2013.01); *Y02C 20/40* (2020.08)

(56) References Cited

U.S. PATENT DOCUMENTS

| | | | |
|---|---|---|---|
| 4,800,051 A | 1/1989 | Yon | |
| 4,923,830 A | 5/1990 | Everhart et al. | |
| 5,045,511 A | 9/1991 | Bosomworth et al. | |
| 5,167,942 A * | 12/1992 | Balkus | B01J 20/18 |
| | | | 423/705 |
| 5,244,726 A | 9/1993 | Laney et al. | |
| 5,320,843 A | 6/1994 | Raheja et al. | |
| 5,342,595 A | 8/1994 | Davidovits et al. | |
| 5,531,808 A * | 7/1996 | Ojo | B01D 53/04 |
| | | | 95/96 |
| 5,680,713 A | 10/1997 | Forbert et al. | |
| 5,725,836 A | 3/1998 | Rouanet et al. | |
| 5,788,950 A | 8/1998 | Imamura | |
| 6,131,305 A | 10/2000 | Forbert et al. | |
| 6,187,248 B1 | 2/2001 | O'Neill et al. | |
| 6,254,845 B1 | 7/2001 | Ohashi et al. | |
| 6,350,428 B1 * | 2/2002 | Verduijn | B01J 20/18 |
| | | | 208/111.01 |
| 6,617,276 B1 * | 9/2003 | Ballinger | B01D 53/944 |
| | | | 502/66 |
| 6,642,285 B1 | 11/2003 | Bohner | |
| 6,699,808 B1 | 3/2004 | Schwertfeger et al. | |
| 6,893,564 B2 | 5/2005 | Mueller et al. | |
| 7,014,881 B2 | 3/2006 | Liu | |
| 7,048,845 B2 * | 5/2006 | Bauer | B01J 29/7007 |
| | | | 208/108 |
| 7,297,321 B2 | 11/2007 | Shpeizer et al. | |
| 7,456,123 B2 | 11/2008 | Wachter | |
| 7,771,686 B2 | 8/2010 | Sagoe-crentsil et al. | |
| 7,851,320 B2 | 12/2010 | Chaumonnot et al. | |
| 8,557,214 B2 | 10/2013 | Seo | |
| 8,563,020 B2 | 10/2013 | Uhlmann et al. | |
| 8,574,358 B2 | 11/2013 | Biscan et al. | |
| 9,242,900 B2 | 1/2016 | Seo et al. | |
| 9,296,654 B2 | 3/2016 | Seo et al. | |
| 9,308,511 B2 | 4/2016 | Seo et al. | |
| 9,365,691 B2 | 6/2016 | Seo et al. | |
| 9,738,621 B2 | 8/2017 | Seo et al. | |
| 9,862,644 B2 | 1/2018 | Seo et al. | |
| 10,170,759 B2 | 1/2019 | Seo | |
| 2001/0023296 A1 | 9/2001 | Kato et al. | |
| 2002/0018747 A1 * | 2/2002 | Pinnavaia | B01J 29/005 |
| | | | 423/702 |
| 2003/0108785 A1 | 6/2003 | Wu et al. | |
| 2003/0168407 A1 * | 9/2003 | Kusakabe | B01D 53/228 |
| | | | 210/650 |
| 2004/0047798 A1 | 3/2004 | Oh et al. | |
| 2004/0093876 A1 * | 5/2004 | Inagaki | B01J 20/0292 |
| | | | 62/112 |
| 2004/0258611 A1 | 12/2004 | Barrow | |
| 2005/0152829 A1 | 7/2005 | Shpeizer et al. | |
| 2005/0272593 A1 | 12/2005 | Wachter | |
| 2006/0057355 A1 | 3/2006 | Suzuki et al. | |
| 2006/0269472 A1 * | 11/2006 | Mackinnon | C01B 39/48 |
| | | | 423/700 |
| 2006/0292054 A1 | 12/2006 | Chaumonnot et al. | |
| 2007/0003749 A1 | 1/2007 | Asgari | |
| 2007/0009689 A1 | 1/2007 | Murer | |
| 2007/0048605 A1 | 3/2007 | Pez et al. | |
| 2007/0125271 A1 | 6/2007 | Barlet-Gouedard et al. | |
| 2007/0125272 A1 | 6/2007 | Johnson | |
| 2007/0128491 A1 | 6/2007 | Chisholm et al. | |
| 2007/0259979 A1 | 11/2007 | Lee | |
| 2008/0028994 A1 | 2/2008 | Barlet-Gouedard et al. | |
| 2008/0028995 A1 | 2/2008 | Barlet-Gouedard et al. | |
| 2008/0067149 A1 | 3/2008 | Piesslinger-Schweiger et al. | |
| 2008/0090716 A1 | 4/2008 | Cherepy | |
| 2008/0226893 A1 | 9/2008 | Yang et al. | |
| 2009/0026413 A1 | 1/2009 | Patoux et al. | |
| 2009/0041653 A1 | 2/2009 | Hwang et al. | |
| 2009/0256262 A1 | 10/2009 | Farnworth et al. | |
| 2009/0288557 A1 | 11/2009 | Carati et al. | |
| 2010/0104500 A1 | 4/2010 | Holland | |
| 2010/0222204 A1 | 9/2010 | Frizon et al. | |
| 2010/0254890 A1 | 10/2010 | Yang et al. | |
| 2011/0073311 A1 | 3/2011 | Porcherie et al. | |
| 2011/0077176 A1 | 3/2011 | Smith et al. | |
| 2011/0092363 A1 | 4/2011 | Seo et al. | |
| 2012/0007020 A1 | 1/2012 | Tarascon et al. | |
| 2012/0227584 A1 * | 9/2012 | Wang | B01D 53/02 |
| | | | 95/139 |
| 2012/0235073 A1 | 9/2012 | Seo et al. | |
| 2012/0280171 A1 | 11/2012 | Belharouak | |
| 2013/0019780 A1 | 1/2013 | Karimi et al. | |
| 2013/0052126 A1 * | 2/2013 | Wang | C01B 39/02 |
| | | | 423/705 |
| 2013/0055924 A1 | 3/2013 | Seo et al. | |
| 2013/0071737 A1 | 3/2013 | Belharouak et al. | |
| 2013/0137010 A1 | 5/2013 | Aitken et al. | |
| 2013/0153830 A1 | 6/2013 | Seo et al. | |
| 2014/0342156 A1 | 11/2014 | Seo et al. | |
| 2015/0246819 A1 | 9/2015 | Brichka et al. | |
| 2016/0141616 A1 | 5/2016 | Seo et al. | |
| 2016/0168032 A1 | 6/2016 | Seo | |
| 2017/0137322 A1 | 5/2017 | Seo et al. | |
| 2019/0223445 A1 | 7/2019 | Seo et al. | |
| 2019/0382273 A1 | 12/2019 | Seo et al. | |

FOREIGN PATENT DOCUMENTS

| | | |
|---|---|---|
| EP | 0013497 | 7/1980 |
| EP | 0497966 | 7/1980 |
| EP | 0138396 | 9/1984 |
| EP | 454239 | 10/1991 |
| EP | 497466 | 8/1995 |
| EP | 1230008 | 8/2002 |
| EP | 2758355 | 7/2014 |
| EP | 3154917 A1 | 4/2017 |
| GB | 1601250 B2 | 10/1981 |
| JP | 2003206112 | 7/2003 |
| KR | 1020010082910 | 8/2001 |
| KR | 1020010107049 | 12/2001 |
| KR | 20110063072 A | 6/2011 |
| KR | 20110073443 A | 6/2011 |
| RU | 2282587 C1 | 8/2006 |
| RU | 2503617 C2 | 1/2014 |
| WO | WO9721785 | 6/1997 |
| WO | WO99032218 | 7/1999 |
| WO | WO0128675 | 4/2001 |
| WO | WO2004018090 | 4/2004 |
| WO | WO2004073021 | 8/2004 |
| WO | WO2005019130 | 3/2005 |
| WO | WO2005054340 | 6/2005 |
| WO | WO2007064053 | 6/2007 |
| WO | WO2007129991 | 11/2007 |
| WO | WO2008124343 | 10/2008 |
| WO | WO2009050196 | 4/2009 |
| WO | WO2009140030 | 11/2009 |
| WO | WO2011046910 | 4/2011 |
| WO | WO2011068830 | 6/2011 |
| WO | WO2011109421 | 9/2011 |
| WO | WO2012018890 | 2/2012 |
| WO | WO2013044016 | 3/2013 |
| WO | WO2013123308 | 8/2013 |
| WO | WO2013163010 A1 | 10/2013 |

(56) References Cited

FOREIGN PATENT DOCUMENTS

| WO | WO2015006010 | 1/2015 | | |
|---|---|---|---|---|
| WO | WO-2015009248 A2 | * | 1/2015 | ............ C01B 39/38 |
| WO | WO2015191817 | 12/2015 | | |
| WO | WO2015191962 | 12/2015 | | |
| WO | WO2018013830 B2 | 1/2018 | | |
| WO | 6/02018136695 A1 | 7/2018 | | |

OTHER PUBLICATIONS

Michels. H. T. et al., "Effects of temperature and humidity on the efficacy of methicillin-resistant *Staphylococcus aureus* challenged antimicrobial materials containing silver and copper", Letters in Applied Microbiology, 2009, vol. 49, pp. 191-195.
Duxson et al. "Geopolymer technology: the current state of the art" J Mater Sci (2007) 42:2917-2933.
Komnitsas et al. "Geopolymerisation: A review and prospects for the minerals industry" Minerals Engineering 20 (2007), pp. 1261-1277.
Provis et al. "Do Geopolymers Actually Contain Nanocrystalline Zeolites? A Reexamination of Existing Results" Chem. Mater. 17, 2005, pp. 3075-3085.
Thomas et al. "Amorphous Zeolites" Angew. Chem. Inr. Ed. Engl. 19 (1980) No. 9, pp. 745-746.
Bell et al. "Nano- and Microporosity in Geopolymer Gels" Microsc Microanal 12 (Supp 2), 2006, pp. 552-553.
W. M. Kriven, "Inorganic Polysialates or 'Geopolymers'" American Ceramic Society Bulletin, May 2010, vol. 89, No. 4, pp. 31-34.
Kriven et al., "Microstructure and nanoporosity of as-set geopolymers" Ceramic Engineering and Science Proceedings 2007, vol. 27, Issue 2, pp. 491-503.
Joseph Davidovits, "Geopolymer Chemistry and Applications" Jun. 2008, Chapter 1, 16 pages.
Joseph Davidovits, Geopolymer Chemistry and Applications, 3rd Edition, Jul. 2011, pp. 1-33.
A. S. Wagh, "Chemically Bonded Phosphate Ceramics—A Novel Class of Geopolymers," Ceramic Transactions 2005, vol. 165, 12 pages.
Nedelec, J.M., "Sol-Gel Processing of Nanostructured Inorganic Scintillating Materials", Journal of Nanomaterials, vol. 2007, Article ID 36392, 8 pages, 2007.
Sivashanmugam, A. et al., "Glycine-Assisted Sol-Gel Combustion Synthesis and Characterization of Aluminum-Doped LiNiVO4 for Use in Lithium-Ion Batteries", Journal of The Electrochemical Society, vol. 153, No. 3, A497-A503, 2006.
Ju Dong-Ying et al., "Low-temperature sintering method for NiCuZn ferrite and effects of Mn addition on electromagnetic properties", Transactions of Nonferrous Metals Society of China, vol. 16, Supplement 1, pp. s67-s70, Jun. 2006.
Rolison, D. R. et al., "Electrically conductive oxide aerogels: new materials in electrochemistry", Journal of Materials Chemistry, vol. 11, pp. 963-980, 2001.
Zhang et al., "Mesostructured Forms of γ-Al2O3", J. Am. Chem. Soc. 124, pp. 1592-1593 (2002).
Baumann, Theodore F. et al., "Synthesis of High-Surface-Area Alumina Aerogels without the Use of Alkoxide Precursors", Chem. Mater., vol. 17, No. 2, pp. 395-401, 2005.
Kübel, Christian et al., "Recent Advances in Electron Tomography: TEM and HAADF-STEM Tomography for Materials Science and Semiconductor Applications", Microscopy and Microanalysis, vol. 11, pp. 378-400, 2005.
Kwak, Ja Hun et al., "Penta-coordinated Al3+ ions as preferential nucleation sites for BaO on γ—Al2O3: An ultra-highmagnetic field 27Al MAS NMR study", Journal of Catalysis, vol. 251, pp. 189-194, 2007.
Boettcher, Shannon W. et al., "Harnessing the Sol-Gel Process for the Assembly of Non-Silicate Mesostructured Oxide Materials", Accounts of Chemical Research, vol. 40, No. 9, pp. 784-792, 2007.

Zürner, Andreas et al., "Visualizing single-molecule diffusion in mesoporous materials", Nature, vol. 450, pp. 705-709, Nov. 29, 2007.
Iancu, Nora et al.,"Low-temperature synthetic method for size-controlled CdSe nanocrystals: utilization of boron selenide", Chem. Commun. 20, pp. 2298-2299, 2004.
Richards, Ryan et al., "Consolidation of Metal Oxide Nanocrystals. Reactive Pellets with Controllable Pore Structure That Represent a New Family of Porous, Inorganic Materials", Journal of American Chemical Society, vol. 122, No. 20, pp. 4921-4925, 2000.
Mulik, Sudhir et al., "Time-Efficient Acid-Catalyzed Synthesis of Resorcinol-Formaldehyde Aerogels", Chem. Mater., vol. 19, No. 25, pp. 6138-6144, 2007.
Villemin, Didier et al., "A one step process for grafting organic pendants on alumina via the reaction of alumina and phosphonate under microwave irradiation", Chem. Commun. 2001, pp. 2060-2061, 2001.
Laine et al. "Making Nanosized Oxide Powders From Precursors by Flame Spray Pyrolysis". Key Engr Matl. 159-160 pp. 17-24. 1999.
Schuyten et al. "A Novel Combustion Synthesis Preparation of CuO/ZnO/ZrO2/Pd for Oxidative Hydrogen Production from Methanol" Catal Lett (2008) 121:189-198.
T. Mahata, G Das, R.K. Mishra, B.P. Sharma, Combustion synthesis of gadolinia doped ceria powder, Journal of Alloys and Compounds, vol. 391, Issues 1-2,5 Apr. 2005, pp. 129-135.
Lee et al., "Recent Progress in the Synthesis of Porous Carbon Materials" Advanced Materials (Weinheim, Germany) (2006), 18(16), pp. 2073-2094.
Pek et al., "A thixotropic nancomposite gel for three-dimensional cell culture" Nature Nanotechnology (2008), 3(11), pp. 671-675.
Morris et al., "Silica Sol as a Nanoglue: Flexible Synthesis of Composite Aerogels" Science (Washington, D.C.) 1999, 284, (5414), pp. 622-624.
Aguado-Serrano et al., "Silica/C composites prepared by the sol-gel method. Influence of the synthesis parameters on textural characteristics", Microporous and Mesoporous Materials. 74, pp. 111-119 (2004).
Aguado-Serrano et al., "Surface and catalytic properties of acid metal-carbons prepared by the sol-gel method", Applied Surface Science. 252, pp. 6075-6079 (2006).
Boffa et al., "Preparation of templated mesoporous silica membranes on macroporous a-alumina supports via direct coating of thixotropic polymeric sols", Microporous and Mesoporous Materials. 100, pp. 173-182 (2007).
Bruno et al., "Characterization of monolithic porous carbon prepared from resorcinol/formaldehyde gels with cationic surfactant", Colloids and Surfaces A: Physicochemical and Engineering Aspects. 358, pp. 13-30 (2010).
Capadona et al., "A versatile approach for the processing of polymer nanocomposites with selfassembled nanofibre templates", Nature Nanotechnology. 2, pp. 765-769 (2007).
Han et al., "The effect of silica template structure on the pore structure of mesoporous carbons", School of Chemical Engineering, Seoul National University, Carbon. 41, pp. 1049-1056 (2003).
Leventis et al., "One-Pot Synthesis of Interpenetrating Inorganic/Organic Networks of CuO/Resorcinol-Formaldehyde Aerogels: Nano structured Energetic Materials", J. Am. Chem. Soc. 131, pp. 4576-4577 (2009).
Moreno-Castilla et al., "Synthesis and surface characteristics of silica- and alumina-carbon composite xerogels", Phys. Chem. Chem. Phys. 2, pp. 4818-4822 (2000).
Capadona et al., "X-Aerogel Processing Time Reduced by One-Pot Synthesis" http://www.grc.nasa.gov/WWW/RT/2006/RX/RX20P-capadonal.html, retrieved on Jul. 26, 2013 (last updated Dec. 14, 2007), 4 pages.
J. Aleman et al., "Definitions of Terms Relating to the Structure and Processing of Sols, Gels, Networks, and Inorganic-Organic Hybrid Materials," Pure and Applied Chemistry, vol. 79, No. 1, 2007, pp. 1801-1829.
Robert L. Burwell, Jr. "Manual of Symbols and Terminology for Physicochemical Quantities and Units—Appendix II. Definitions,

(56) References Cited

OTHER PUBLICATIONS

Terminology and Symbols in Colloid and Surface Chemistry. Part II: Heterogeneous Catalysis," Pure and Applied Chemistry, vol. 46, 1976, pp. 71-90.

C. H. Christensen et al., "Mesoporous zeolite single crystal catalysts: Diffusion and catalysis in hierarchical zeolites" Catalysis Today 128, 2007, pp. 117-122.

N.-L. Michels et al., "Hierarchically Structured Zeolite Bodies: Assembling Micro-, Meso-, and Macroporosity Levels in Complex Materials with Enhanced Properties" Adv. Funct. Mater. 22, 2012, pp. 2509-2518.

D. P. Serrano et al., "Synthesis strategies in the search for hierarchical zeolites" Chemical Society Reviews 42, 2013, pp. 4004-4035.

L. Gueudré et al, "Diffusion in zeolites: is surface resistance a critical parameter?" Adsorption 16, 2010, pp. 17-27.

O. Cheung et al., "Adsorption kinetics for $CO_2$ on highly selective zeolites NaKA and nano-NaKA" Applied Energy 112, 2013, pp. 1326-1336.

A. L. Myers et al., "Thermodynamics of Mixed-Gas Adsorption" A.I.Ch.E. Journal, vol. 11, No. 1, Jan. 1965, pp. 121-127.

O. Cheung et al., "Silicoaluminophosphates as $CO_2$ sorbents" Microporous Mesoporous Materials 156, 2012, pp. 90-96.

Gresham, Dr. Robert M., contributing editor, "Viscosity: A fluid's resistance to flow," Tribology & Lubrication Technology, Nov. 2008, pp. 55-57.

Le-Ping L et al, "Preparation phosphoric acid-based porous geopolymers," Applied Clay Science, vol. 50, No. 4, Dec. 1, 2010, pp. 600-603.

PCT Officer Jeong A. Lee, International Search Report and Written Opinion of International Application No. PCT/US2015/035492, dated Aug. 28, 2015, 16 pages.

Hasan, F. A. et al., "Zeolite monoliths with hierarchical designed pore network structure: Synthesis and performance," Chemical Engineering Journal, Mar. 7, 2013 (Online), vol. 223, pp. 48-58.

Zhang, J. et al., "Synthesis of a self-supporting faujasite zeolite membrane using geopolymer gel for separation of alcohol/water mixture," Materials Letters, Nov. 9, 2013 (Online), vol. 116, pp. 167-170.

Akhtar, F. et al., "Colloidal processing and CO2 capture performance of sacrificially templated zeolite monoliths", Applied Energy, Jan. 13, 2012 (Online), vol. 97, pp. 289-296.

International Preliminary Report on Patentability for International application No. PCT/US2015/035492, dated Dec. 22, 2016, 12 pages.

PHR Borges et al., "Andreasen Particle Packing Method on the Development of Geopolymer Concrete for Civil Engineering", J. Mater. Civ. Eng. 26 (2014) 692-697.

K De Weerdte, "Geopolymers—State of the art", COIN Project report No. 37, 2011, 39 pages.

D Medpelli, "New Nanostructured Aluminosilicates from Geopolymer Chemistry", PhD Thesis, Arizona State University Tempe, Arizona, May 2015, 192 pages.

C Montes et al., "Statistical software to improve the accuracy of geopolymer concrete mix design and proportioning", 2013 World of Coal Ash (WOCA) Conference—Apr. 22-25, 2013 in Lexington, KY, 9 pages.

A Poulesquen et al., "Rheological behavior of alkali-activated metakaolin during geopolymerization", Journal of Non-Crystalline Solids 357 (2011) 3565-3571.

M Romagnoli et al., "Rheology of geopolymer by DOE approach", Construction and Building Materials 36 (2012) 251-258.

K Shotri, Dynamic Mechanical Properties of Geopolymer-Polymer Composites, MSc thesis, Center for Materials Science and Engineering, Rochester Institute of Technology, New York, 2006, 86 pages.

Fatin Hasan et al. "Direct synthesis of hierarchical LTA zeolite via a low crystallization and growth rate technique in presence of cetyltrimethylammonium bromide," Journal of Colloid and Interface Science 382 (2012) 1-12.

Cao and Limmer, "Oxide Nanowires and Nanorods," Encyclopedia of Nanoscience and Nanotechnology, Nalwa (ed.), 2004, 8:377-396.

Hasan et al., "Formation of LTA zeolite crystals with multi-hollow polycrystalline core-shell structure via aggregation-recrystallization route in presence of emulsion droplets," Microporous and Mesoporous Materials, 2012, 160:75-84.

Hasan et al., "Zeolite monoliths with hierarchical designed pore network structure: Synthesis and Performance," Supporting Information, Monash University, Department of Chemical Engineering, May 2013, 9 pages.

\* cited by examiner

CARBON DIOXIDE ADSORBENTS

CROSS-REFERENCE TO RELATED APPLICATIONS

This application is a U.S. National Phase Application of International Patent Application No. PCT/US2015/035492 filed on Jun. 12, 2015, which claims the benefit of U.S. Provisional Application Ser. No. 62/011,270 entitled "CARBON DIOXIDE ADSORBENTS" and filed on Jun. 12, 2014, the contents of both of which are incorporated herein by reference in their entirety.

TECHNICAL FIELD

This invention relates to hierarchical zeolites for carbon dioxide adsorptive separation, as well as carbon dioxide gas separation processes that use hierarchical zeolites as adsorbents.

BACKGROUND

As concerns over the impact of rising concentrations of atmospheric carbon dioxide on climate change continue to mount, there is an urgent need for the development and implementation of technologies that mitigate carbon dioxide ($CO_2$) emissions from anthropogenic sources. In addition to fossil fuels such as natural gas, coal, oil shale, and oil sands, carbonaceous materials such as agricultural, forest, and municipal wastes can be converted into combustible gases through thermochemical processing.

Carbon capture and sequestration (CCS) has been proposed as a means of limiting carbon dioxide emissions from large stationary sources, such as fossil fuel-burning power plants which contribute 80 percent of carbon dioxide emissions. Specifically, retrofitting existing power plants for post-combustion carbon dioxide capture, wherein the carbon dioxide is selectively removed from a flue gas stream and permanently sequestered in underground geological formations, is a near-term scenario under which CCS could be rapidly deployed. For this purpose, the captured carbon dioxide must have a high purity in order to make its compression, transport, and injection underground economically feasible. For coal-fired power plants, the largest flue gas components by volume are nitrogen ($N_2$) (70-75%), carbon dioxide (15-16%), water ($H_2O$) (5-7%) and oxygen ($O_2$) (3-4%), with a total pressure near 1 bar and temperatures between 40 and 60° C. However, commercial carbon dioxide separation technology that exists today is expensive and energy intensive. Development of low-cost regenerable sorbents that are highly selective for carbon dioxide over nitrogen and have a high adsorption capacity for $CO_2$ enable the success of more affordable technologies such as vacuum, pressure or temperature swing adsorption (VSA/PSA/TSA) processes.

Another application of carbon dioxide separation technology based on VSA/PSA/TSA processes is biogas upgrading. Raw biogas includes methane ($CH_4$) and carbon dioxide, with minor components such as water, hydrogen sulfide ($H_2S$), and siloxanes. Biogas can typically be used for applications designed for natural gas. The use of biogas as vehicle fuel has increased over the last few years. For an effective use of biogas as vehicle fuel, it must generally be enriched in methane. This enrichment is primarily achieved by carbon dioxide removal, which results in improved mileage with a fixed gas storage volume. Biogas upgrading based on VSA/PSA/TSA processes is advantageous for low and intermediate flow rates of raw biogas produced on farms and in small towns and villages, especially where flow rates are below 200 m³/hour. The advantages of biogas upgrading include low energy consumption and maintenance which result in low operating costs, no water requirement for the upgrading process, and small equipment size.

Rather than burning biomass or fossil resources directly, gasification can be used to produce energy. Gasification uses a mixture of carbon monoxide, hydrogen, and methane known as synthesis gas (syngas). The primary components of syngas include carbon monoxide (CO) and hydrogen ($H_2$). Syngas can undergo the water-gas shift reaction to produce primarily hydrogen and carbon dioxide in a 1:1 molar ratio. Approximately 50 million tons of hydrogen are synthesized each year through this coupled gasification and water-gas shift process. The separation of hydrogen and carbon dioxide is most commonly accomplished using PSA, where the gas product mixture is exposed under high pressure to solid adsorbents including a mixture of zeolites and activated carbons to adsorb carbon dioxide. Subsequent carbon dioxide release occurs upon a pressure decrease or purge with hydrogen.

Carbon dioxide can be also emitted in large quantities in the production of various materials or chemicals including ammonia, steel, and Portland cement, as well as during combustion of industrial, agricultural, or municipal wastes.

SUMMARY

In a first general aspect, a carbon dioxide adsorbent includes a hierarchical zeolite defining micropores having a pore width between about 0.4 nm and about 2 nm; and at least one of: mesopores having a pore width between about 2 nm and about 50 nm; and macropores having a pore width greater than about 50 nm.

In a second general aspect, forming a carbon dioxide adsorbent includes heating a composition including a geopolymer resin up to about 100° C. to yield a heated composition; and separating a solid from the heated composition to yield the carbon dioxide adsorbent, wherein the mole fraction of water in the geopolymer resin before heating is up to about 0.85.

In a third general aspect, removing carbon dioxide from a gas stream comprising carbon dioxide includes contacting a first gas stream including carbon dioxide with a carbon dioxide adsorbent including a hierarchical zeolite; and adsorbing carbon dioxide from the first gas stream onto the carbon dioxide adsorbent, thereby removing some of the carbon dioxide from the first gas stream to yield a second gas stream, wherein the second gas stream has a lower concentration of carbon dioxide than the first gas stream. The hierarchical zeolite defines micropores having a pore width between about 0.4 nm and about 2 nm; and at least one of: mesopores having a pore width between about 2 nm and about 50 nm; and macropores having a pore width greater than about 50 nm.

Implementations of the first, second, and third general aspects may include one or more of the following features.

The hierarchical zeolite may have a faujasite structure, a zeolite A structure, or a combination thereof. In some cases, the hierarchical zeolite includes aggregates of crystallites having a faujasite structure. In certain cases, the hierarchical zeolite comprises aggregates of crystallites having a zeolite A structure. The faujasite structure may be synthetic. In some cases, the crystallites are intergrown. The hierarchical zeolite and the crystallites may define mesopores. The mesopores may be textural. In some cases, the crystallites have an average size up to about 100 nm or up to about 50 nm.

In some cases, the crystallites have an average size up to about 200 nm, up to about 100 nm, or up to about 50 nm. The hierarchical zeolite may have a ratio of silicon atoms to aluminum atoms up to about 3, up to about 2, or up to about 1.5. The hierarchical zeolite may have a crystallinity of at least about 80%, at least about 90%, at least about 95%, or at least about 99% based on the micropore volume of the hierarchical zeolite estimated from gas sorption measurements.

In certain cases, the hierarchical zeolite is at least partially ion-exchanged with an alkali metal ion, an alkaline earth metal ion, a rare earth metal ion, a transition metal ion, or a combination thereof. The hierarchical zeolite may be at least partially ion-exchanged with lithium, potassium, rubidium, cesium, magnesium, calcium, strontium, barium, or a combination thereof.

The hierarchical zeolite may have a carbon dioxide adsorption capacity of at least about 4 mmol/g at about 0° C. in a $CO_2$ gas stream with a pressure of about 100 kPa. In one example, the hierarchical zeolite has an isosteric heat of carbon dioxide adsorption up to about 40 kJ/mol for carbon dioxide adsorption capacities ranging from about 2.5 mmol/g to about 5 mmol/g. The hierarchical zeolite has an ideal adsorbed solution theory (IAST) carbon dioxide-over-nitrogen adsorption selectivity of at least about 46, at least about 100, at least about 200, at least about 400, or at least about 600 when contacted with a gas mixture comprising about 15 mol % carbon dioxide and about 85 mol % nitrogen at about 20° C. under a total pressure of about 100 kPa.

The carbon dioxide adsorbent may be in the form of a powder, a film, a fiber, granules, beads, pellets, or a coating. In some cases, the carbon dioxide adsorbent is in the form of a fiber, and the fiber is hollow. In certain cases, the carbon dioxide adsorbent is in the form of granules, beads, pellets, or a coating, and the granules, beads, pellets, or coating are formed with or without a binder.

Implementations of the second general aspect may include one or more of the following features.

The composition may be heated for up to about a week. The alkalinity of the geopolymer resin may be reduced. Reducing the alkalinity of the geopolymer resin may include combining the composition with an organic liquid to yield a mixture comprising the geopolymer resin and the organic liquid. The composition may be heated up to about 100° C. to yield the heated composition. The composition may be heated for up to about a week. The composition may be heated in a closed container.

Implementations of the third general aspect may include one or more of the following features. Some of the carbon dioxide may be desorbed from the carbon dioxide adsorbent to yield a third gas stream comprising desorbed carbon dioxide. Desorbing at least some of the carbon dioxide from the carbon dioxide adsorbent may include changing the gas pressure on the carbon dioxide adsorbent, the temperature of the carbon dioxide adsorbent, or both. The carbon dioxide adsorption capacity of the carbon dioxide adsorbent after desorbing at least some of the carbon dioxide from is at most about 15% less, at most about 10% less, or at most about 5% less than the initial equilibrium adsorption capacity of the carbon dioxide adsorbent before contacting the first gas stream with the carbon dioxide adsorbent.

The first gas stream may include flue gas, biogas, or natural gas. In some cases, the first gas stream is produced from an industrial process or a waste combustion or breakdown process. The first gas stream may include up to about 70 mol % carbon dioxide, up to about 30 mol % carbon dioxide, up to about 15 mol % carbon dioxide, up to about 5 mol % carbon dioxide or up to about 1 mol % carbon dioxide. The second gas stream may include up to about 30 mol %, up to about 20 mol %, up to about 10 mol %, up to about 5 mol %, up to about 1 mol %, or up to about 0.5 mol % of carbon dioxide. In certain cases, the first gas stream includes water, and some of the water is removed from the first gas stream before contacting the first gas stream with the carbon dioxide adsorbent. In some cases, the third gas stream has a carbon dioxide concentration of at least about 30 mol %, at least about 50 mol %, at least about 70 mol %, at least about 90 mol %, at least about 95 mol %, or at least about 99 mol %.

The details of one or more implementations of the subject matter described in this specification are set forth in the accompanying drawings and the description below. Other features, aspects, and advantages of the subject matter will become apparent from the description, the drawings, and the claims.

Figure 1:
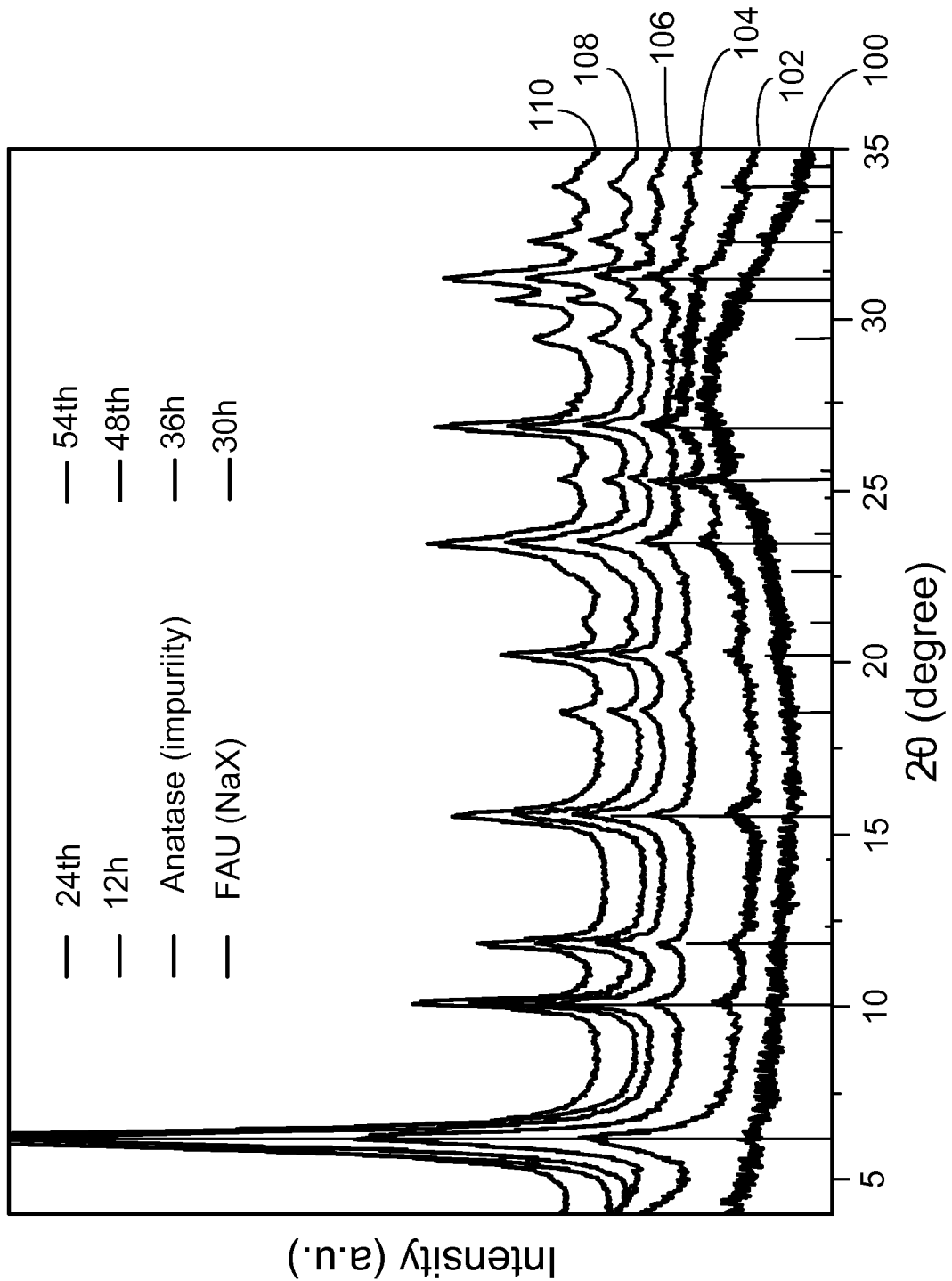
FIG. 1 shows powder X-ray diffraction (XRD) patterns of samples prepared as described in Example 1 (3.0 $Na_2O$: $Al_2O_3$:4.0 $SiO_2$:32.4 $H_2O$ and canola oil/$H_2O$ (v/v)=1.0) heated at 60° C. for 12, 24, 30, 36, 48, and 54 hours, with the simulated patterns of faujasite (NaX) and anatase (an impurity).

DETAILED DESCRIPTION $CO_2$ adsorbent materials and methods for removal of $CO_2$ adsorbed to the adsorbent materials are described.

Zeolites are typically described as crystalline aluminosilicates having ordered channel and/or cage structures and containing micropores ("zeolitic micropores") which are typically smaller than about 0.9 nm. Zeolites such as NaX, NaY, and zeolite A are inexpensive and have high $CO_2$ uptake and selectivity due to the high electrical field gradients in their micropores. These electrical field gradients are induced by the negatively charged framework and the charge balancing cations of the zeolites. Aluminum-containing zeolites are able to adsorb $CO_2$ largely due to the negative aluminum framework charge that is compensated for by exchangeable cations (often alkali metal cations) in the pore space. These alkali metal cations enable zeolites to adsorb acidic gases such as $CO_2$. Ideally, a low Si/Al ratio is favored to promote the presence of more cations.

Adsorption of $CO_2$ via zeolites is well suited for VSA/PSA/TSA processes due to their favorable kinetics and capacities at mild operating conditions. Zeolites have relatively high adsorption capacities at mild operating conditions (0-100° C., 0.1-1 bar $CO_2$). Adsorption capacities for zeolites at mild operating conditions range from 0.09-5 mmol $CO_2$/g zeolite. Although adsorption using zeolites is classified as physisorption, studies have found that some $CO_2$ does irreversibly chemisorb on the zeolite surface in the form of carbonates and carboxylates. If desorption is performed using a pressure swing process, these chemisorbed $CO_2$ molecules generally cannot be liberated from the surface. This results in a reduction in capacity up to about 0.5 mmol $CO_2$/g zeolite. The zeolite adsorbents can typically be fully regenerated only by heating the adsorbent (around 623 K) under high vacuum, which is generally too energy-demanding to apply in practice.

Hierarchical zeolites are zeolitic materials having a hierarchical porosity with at least two levels of pore sizes. That is, hierarchical zeolites possess, in addition to the typical and uniform zeolitic micropores, a secondary porosity. The secondary porosity may include pores with different widths extending from supermicropores (i.e., pores with a pore width less than about 0.4 nm) to mesopores (i.e., pores with a pore width between about 2 nm and about 50 nm) or macropores (i.e., pores with a pore width greater than about 50 nm). In this disclosure, the terms "pore width," "pore size," and "pore diameter," are used interchangeably. As used herein, micropores have a pore width between about 0.4 nm and about 2 nm. In most cases the secondary porosity of a hierarchical zeolite lies within the mesopore range, with the pore size generally determined by the synthetic strategy used to form the zeolite. As described herein, $CO_2$ adsorbent materials are hierarchical zeolites with micropores and at least one of mesopores and macropores (i.e., hierarchical zeolites "exhibit" or "define" micropores and at least one of mesopores and macropores).

The diffusion rate of molecules through the zeolite micropores depends at least in part on the size of the molecules, and decreases as the size of the molecules approaches the dimensions of the zeolite channels (configurational diffusion). Consequently, the intracrystalline transport becomes the rate-controlling step in many adsorption and catalytic processes over zeolites. This limitation can be overcome with hierarchical zeolites, as diffusion through the secondary porosity (e.g., mesoporosity) is faster, taking place by mechanisms closer to the classical Knudsen diffusion. The net effect regarding the transport within the zeolite micropore is a significant reduction of the length of the diffusional pathway. Since the overall diffusion rate is inversely proportional to the square of the diffusional pathway, this may result in an increase of the diffusion rate by 2 to 3 orders of magnitude.

Changes in the selectivity, especially in the product selectivity in catalytic reactions, may also take place since the presence of the hierarchical porosity implies a variation in the length of the diffusional pathway. Reduction of the diffusional pathway may increase the relative importance of the chemical factors related to the nature of the active sites with respect to diffusional factors. Due to shortened diffusion pathways, shape-selectivity effects may be less pronounced in hierarchical zeolites, which may affect negatively their performance, for example, in catalysis in terms of product distribution. In some cases, product selectivity may be improved due to a shorter residence time within the zeolite micropores, thereby avoiding conversion of the primary products through undesired secondary reactions.

If diffusional factors become less critical, hierarchical structures may improve the gas adsorption selectivity as well for the zeolites whose chemical nature favors selective adsorption of a specific gas, for example, $CO_2$. However, additional effects may also be related to the secondary porosity of hierarchical zeolites. Due to the discontinuity of the crystalline framework at the secondary or mesopore surface, the chemical nature of this pore surface represents that of nanozeolites. That is, the Si and Al species present a lower T atom connectivity compared with the positions inside the channels, and a high population of silanol groups are also found on surfaces defined by the mesopores. Accordingly, hierarchical zeolites show in many aspects features intermediate between conventional zeolites and amorphous aluminosilicates.

An amorphous skin layer at the secondary or mesopore surface may act as a diffusion barrier and thus negatively affect gas adsorption processes. For example, surface resistance has been shown to be far from negligible for the zeolite crystals that are no larger than 2 μm, for which surface resistance represents more than 60% of the total mass transfer resistance at 398 K. Furthermore, it has been speculated that surface resistance may not be located at the extreme surface of the crystals but in a layer of non-negligible thickness of distorted crystal structure around the crystals. In another example, it was found that nanosized zeolite A (~200 nm) did not show an increased adsorption rate in comparison to larger zeolite A (4 μm), which was attributed to a skin layer that had formed on the nanosized zeolite A, as well as imperfections within the small crystals, remaining water, or other effects. Furthermore, the $CO_2$-over-$N_2$ selectivity was not affected by the crystal size. In some cases, hierarchical zeolites can be shaped into technically suitable geometries by granulation with a clay binder, retaining their chemical and textural properties.

Various synthetic methods are available for production of hierarchical zeolites with different chemical structures and pore structures at various length scales. In some implementations, hierarchical zeolites are produced by using a geopolymer resin as a precursor. For example, WO 2013/044016, which is incorporated herein by reference, describes processes of producing hierarchical zeolites by mixing a geopolymer resin and canola oil.

As used herein, "geopolymers" are generally referred to by a variety of terms, including low-temperature aluminosilicate glass, alkali-activated cement, geocement, alkali-bonded ceramic, inorganic polymer concrete, and hydroceramic. Despite this variety of nomenclature, these terms all describe materials synthesized utilizing the same chemistry, which can be described as a complex system of coupled alkali-mediated dissolution and precipitation reactions of aluminosilicates in an aqueous reaction substrate. Geopolymers are nanomaterials that exhibit a dense gel-like structure with 5 nm to 60 nm-sized amorphous aluminosilicate particles. Their chemical structure generally includes an amorphous, three-dimensional network of corner-sharing aluminate and silicate tetrahedra, with the negative charge due to $Al^{3+}$ ions in the tetrahedral sites balanced typically by the alkali metal ions. Alkali-activated aluminosilicates are a type of geopolymer. Geopolymers can be prepared typically by curing geopolymer resins. In some cases, geopolymer resins are prepared by coupled alkali-mediated dissolution and precipitation reactions of silicate or aluminosilicate precursors in an aqueous media. The term "geopolymerization process" used herein includes all the chemical processes that provide a geopolymer. As used herein, a "geopolymer resin" is uncured or partially cured alkali-activated aluminosilicates from the geopolymerization process.

In some cases, forming a $CO_2$ adsorbent includes heating a composition including a geopolymer resin up to about 100° C. to yield a heated composition, and separating a solid product from the heated composition to yield the $CO_2$ adsorbent. The geopolymer resin typically contains water in an amount no greater than a mole fraction of about 0.85. In some cases, the composition also includes an organic liquid that can undergo a saponification reaction when the organic liquid is in contact with the geopolymer resin, thereby yielding the mixture. In certain cases, the composition is heated at a temperature no higher than about 100° C. for no longer than a week. Heating the composition may include heating the composition in a container closed to the environment (a "closed container") at a temperature no higher than about 100° C. for no longer than a week. In certain cases, heat is removed from the heated composition before the solid product is separated from the heated.

In some implementations, the hierarchical zeolites have a faujasite structure (FAU) and define mesopores. The FAU zeolites are typically synthetic (i.e., man-made rather than occurring in nature). In some cases, the hierarchical zeolites are aggregates of intergrown small crystallites of synthetic FAU zeolite, exhibiting textural mesopores, with the small crystallites having an average size not larger than about 200 nm. In some cases, the small crystallites have an average size not larger than about 100 nm, or not larger than about 50 nm. In certain cases, the hierarchical zeolites have a FAU structure and exhibit both mesopores and macropores. As used herein, "textural mesopores" generally refers to mesopores between the small crystallites.

In some cases, the hierarchical zeolites have a zeolite A structure (LTA). In some cases, the hierarchical zeolites are aggregates of intergrown small crystallites of synthetic zeolite A, exhibiting textural mesopores, wherein the small crystallites have an average size not larger than about 200 nm. In some case, the hierarchical zeolites have a LTA structure and exhibit both mesopores and macropores.

In some cases, the hierarchical zeolites have a Si/Al ratio not greater than about 3, not greater than about 2, or not greater than about 1.5. In some cases, the hierarchical zeolites have a crystallinity not lower than about 80%, about 90%, about 95% or about 99% based on the micropore volume estimated from gas sorption measurements.

In some implementations, the hierarchical zeolites are ion-exchanged fully or partially with alkali metals, alkaline earth metals, transition metal, or rare earth metals including, for example, lithium, potassium, rubidium, cesium, magnesium, calcium, strontium, barium, or a combination thereof, some or all of which may be in ionic form, to modify the pore size and/or chemical nature of the zeolite micropores.

In some implementations, the hierarchical zeolites have a $CO_2$ adsorption capacity over about 4 mmol/g at 0° C. in a 99.999 mol % $CO_2$ gas stream with a pressure of 100 kPa.

In some implementations, the $CO_2$ adsorption capacity of a hierarchical zeolite decreases no more than about 15% after the first desorption (i.e., a hierarchical zeolite loses no more than about 15% its $CO_2$ adsorption capacity in its first adsorption/desorption cycle, when compared to the initial equilibrium adsorption capacity before the desorption step in the first cycle). In some cases, the $CO_2$ adsorption capacity of a hierarchical zeolite decreases no more than about 10% or no more than about 5% after the first desorption.

In some implementations, the hierarchical zeolites have a heat of $CO_2$ adsorption not greater than about 40 kJ/mol for the capacities ranging from about 2.5 to about 5 mmol/g.

In some implementations, the hierarchical zeolites have an ideal $CO_2$-over-$N_2$ adsorption selectivity greater than about 46 or greater than about 100 in a mixture of about 15 mol % $CO_2$ and about 85 mol % $N_2$ at 20° C. under a total pressure of about 100 kPa. As used herein, "about" refers to ±10% (e.g., about 100° C. refers to a range of temperatures between 90° C. and 110° C.)

In some implementations, the hierarchical zeolites have an Ideal Adsorbed Solution Theory (IAST) $CO_2$-over-$N_2$ selectivity great than about 400 or greater than about 600 in a mixture of about 15 mol % $CO_2$ and about 85 mol % $N_2$ at 20° C. under a total pressure of about 100 kPa. In some cases, the hierarchical zeolites have an IAST $CO_2$-over-$N_2$ selectivity over about 600 in a mixture of about 15 mol % $CO_2$ and about 85 mol % $N_2$ at 20° C. under a total pressure of about 100 kPa.

In some implementations, the hierarchical zeolites have an IAST $CO_2$-over-$CH_4$ selectivity greater than about 100 or greater than about 200 in a mixture of about 50 mol % $CO_2$ and about 50 mol % $CH_4$ at 20° C. under a total pressure of about 100 kPa.

In some implementations, the adsorbents are a powder, a film, or a coating. In some cases, the adsorbents are granules, beads, or pellets formed with or without a binder.

As described herein, a process for removing $CO_2$ from a gas stream containing $CO_2$ uses an adsorbent comprising hierarchical zeolites. The process may include, for example, (a) passing the gas stream through an adsorbent having a hierarchical zeolite material to adsorb the $CO_2$ onto the adsorbent and to produce a gas stream containing less than about 10 mol %, less than about 5 mol %, or less than about 1 mol % $CO_2$; and (b) optionally changing pressure or temperature of the adsorbent having $CO_2$ adsorbed thereon to desorb at least some of the adsorbed $CO_2$.

Gas streams containing $CO_2$ include, for example, a flue gas, a biogas, or a natural gas, a gas stream from an industrial process, and a gas stream from a waste combustion or breakdown process, any one of which may be pretreated to reduce the relative pressure of the moisture to less than about 0.01, about 0.001, or about 0.0004. Flue gases may be from power plants, furnaces in industries, blast furnaces or cement kilns. The industrial processes include manufacturing, petroleum refining, construction, mining, and agriculture. In some cases, the manufacturing processes may produce paper, food, chemicals, metals, minerals or cement. In some cases, the manufacturing processes may produce hydrogen, ammonia, ethanol, ethylene oxide or steel. The waste breakdown processes include microbiological decomposition of land-filled garbage.

Isothermal gas adsorption experiments are typically carried out with a thermogravimetric analyzer (TGA) to measure the gravimetric adsorption capacity of an adsorbent. The kinetics of the gas uptake can be monitored using the same method. The IAST can be used to predict binary adsorption isotherms using the adsorption isotherms of pure gases. In IAST, selectivity of $CO_2$ over $N_2$ is defined within a two phase model as the ratio of mole fraction of $CO_2$ in the adsorbed state ($x_{CO_2}$) over the mole fraction of $CO_2$ in the gas phase ($y_{CO_2}$) divided by the relative fractions, $x_{N_2}$ and $y_{N_2}$, defined for $N_2$:

$$\alpha_{CO_2/N_2} = \frac{x_{CO_2} \cdot y_{N_2}}{x_{N_2} \cdot y_{CO_2}}.$$

An alternative measure of selectivity is the ideal $CO_2$-over-$N_2$ selectivity ($S_{CO_2/N_2}$) which is estimated with a mixture gas that contains 15 mol % $CO_2$ and 85 mol % $N_2$ as the ratio of equilibrium mole fraction of $CO_2$ adsorbed at 15 kPa ($x_{CO_2}^{15}$) over the equilibrium mole fraction of $N_2$ adsorbed at 85 kPa ($y_{N_2}^{85}$):

$$S_{CO_2/N_2} = \frac{x_{CO_2}^{15} \cdot 85}{y_{N_2}^{85} \cdot 15}.$$

The isosteric heat of adsorption can be calculated using adsorption isotherms obtained at different temperatures relying on the Clausius-Clapeyron equation.

EXAMPLES

Example 1

Deionized water was used throughout the synthesis and purification. In a typical synthesis, 9.114 g of NaOH pellets (Sigma Aldrich) and 23.411 g of water glass (Sigma Aldrich) were dissolved in 16.382 g of water in a polypropylene beaker. After the solution had cooled, 11.467 g of metakaolin (MetaMax® from BASF) was slowly added into the solution while stirring. The resulting mixture was homogenized with a mechanical mixer (IKA® RW 60 digital mixer) at 800 rpm for about 40 min to obtain a visually homogeneous and free flowing resin ("geopolymer resin") with the following final molar composition: 3.0 $Na_2O$:1.0 $Al_2O_3$:4.0$SiO_2$:32.4 $H_2O$. For those samples prepared by the addition of canola oil, canola oil (The J.M. Smucker Company, Crisco®) was added to the geopolymer resin and the mechanical stirring at 800 rpm was continued for additional 10 min to give a homogeneous "resin-oil blend". The geopolymer resins or resin-oil blends were poured into 50 ml polypropylene tubes and tightly closed with lids. The closed tubes were then placed in a laboratory oven at 60° C. or 90° C. for an appropriate length of heating time. After the heating, the products, having a consistency of pastes, were taken out from the tubes and washed first with hot water (90° C.) multiple times. The final products were collected via vacuum filtration using filter paper. The pH of the filtrates was about 8. The filtrates were then dried in a laboratory oven at 110° C. overnight and were stored in sealed glass vials at room temperature for further analysis. For the products prepared without adding oil, it was noticed that the products were ultrafine particles (nanoparticles) which could not be isolated via simple vacuum filtration. Therefore, the product pastes were first dispersed in water and purified by repeated centrifugation and redispersion in water until the pH decreased to a constant near-neutral value. The precipitates were then dried in a laboratory oven and were stored in sealed glass vials at room temperature for further analysis.

FIG. 1 shows XRD patterns of samples prepared as described in Example 1 (3.0 $Na_2O$:1.0 $Al_2O_3$:4.0 $SiO_2$: 32.4 $H_2O$ and canola oil/$H_2O$ (v/v)=1.0) heated at 60° C. for 12, 24, 30, 36, 48 and 54 hours corresponding to plots 100, 102, 104, 106, 108, and 110, respectively. Simulated patterns of faujasite (NaX) and anatase (an impurity) are shown, with the anatase impurity having 2θ closest to 25.

Figures 2A, 2B, 2C, 2D:
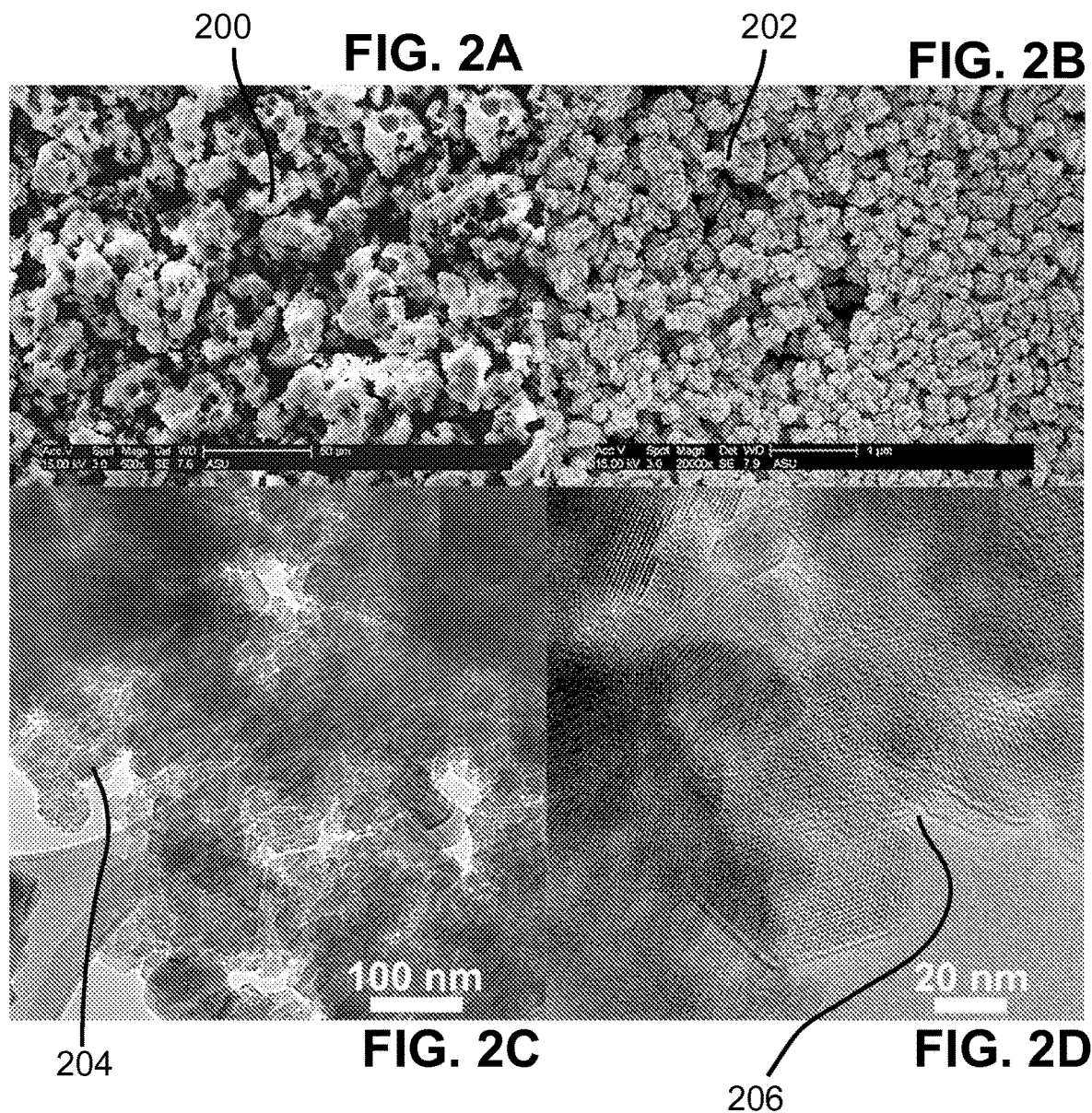
FIGS. 2A and 2B show scanning electron microscope (SEM) images and FIGS. 2C and 2D show transmission electron microscope (TEM) images of samples prepared as described in Example 1 with canola oil heated at 60° C. for 54 hours.

FIGS. 2A and 2B show SEM images and FIGS. 2C and 2D show TEM images of samples 200, 202, 204, and 206, respectively, prepared as described in Example 1 with canola oil heated at 60° C. for 54 hours. The scale bars in FIGS. 2A and 2B are 50 μm and 1 μm, respectively.

Figure 3A:
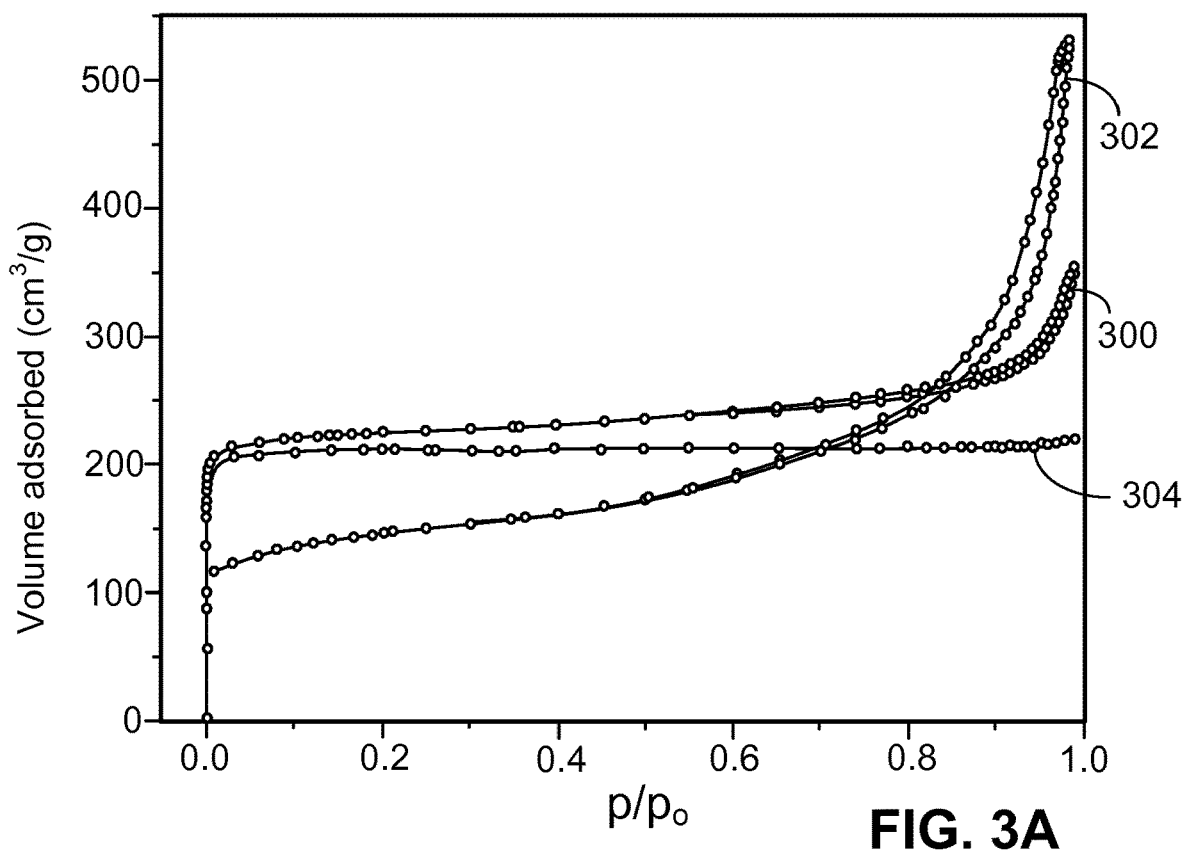
FIG. 3A shows $N_2$ sorption isotherms of samples prepared as described in Example 1 with and without canola oil heated at 60° C., with NaX as a reference.
Figure 3B:
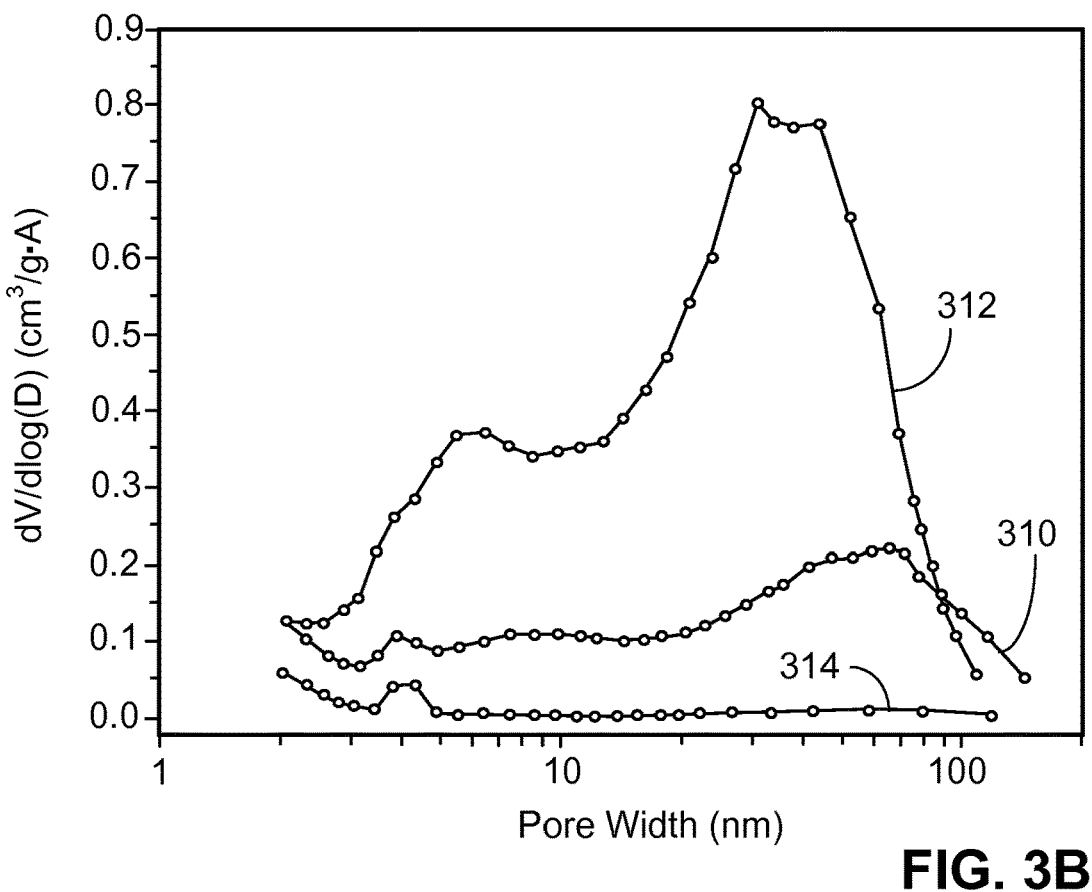
FIG. 3B shows Barret-Joyner-Halenda (BJH) pore distributions of samples prepared as described in Example 1.

FIG. 3A shows $N_2$ sorption isotherms of samples prepared as described in Example 1 with and without canola oil heated at 60° C. shown as plots 300 and 302, respectively, with NaX as a reference shown in plot 304. FIG. 3B shows BJH pore distributions of samples prepared as described in Example 1, with plots 310, 312, and 314 corresponding to plots 300, 302 and 304, respectively.

Figure 4:
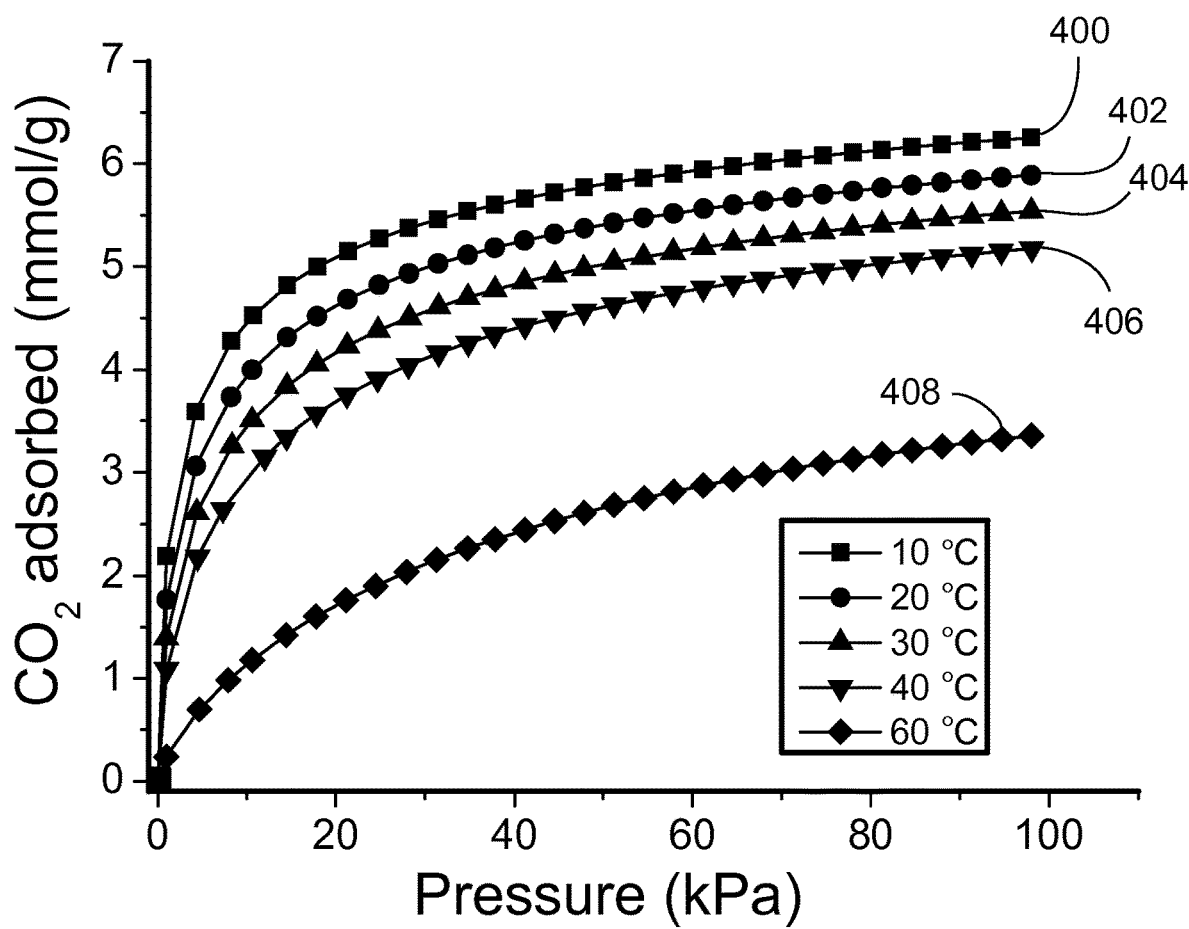
FIG. 4 shows variable temperature $CO_2$ adsorption isotherms for a sample prepared as described in Example 1.

FIG. 4 shows variable temperature $CO_2$ adsorption isotherms for a sample prepared as described in Example 1, with plots 400, 402, 404, 406, and 408 corresponding to 10° C., 20° C., 30° C., 40° C., and 60° C., respectively.

Figure 5:
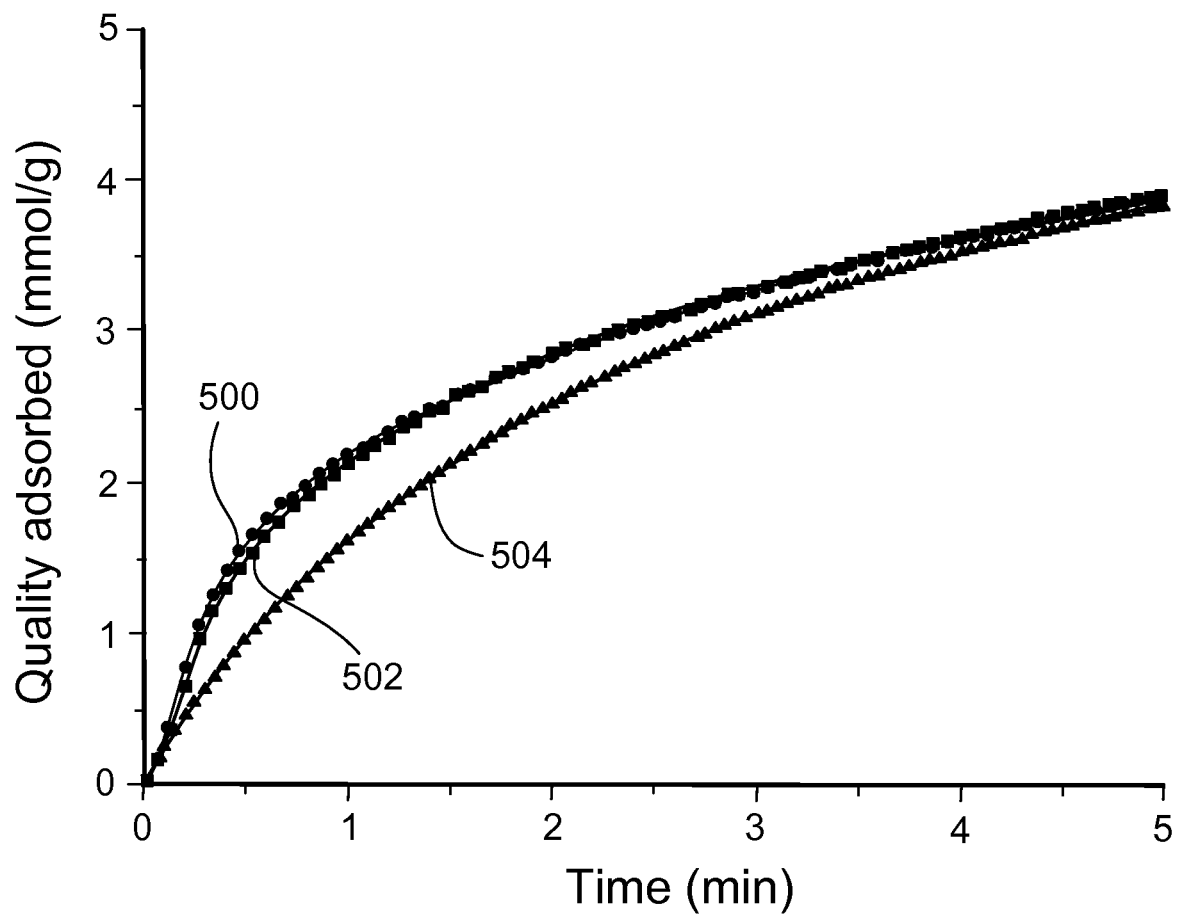
FIG. 5 shows kinetics of $CO_2$ adsorption of a sample prepared as described in Example 1, another hierarchical zeolite sample, and a 13× reference (from Sigma Aldrich) at 25° C.

FIG. 5 shows kinetics of $CO_2$ adsorption of a sample prepared as described in Example 1, another hierarchical zeolite sample, and a 13X reference (from Sigma Aldrich) at 25° C. in plots 500, 502, and 504, respectively.

Figure 6:
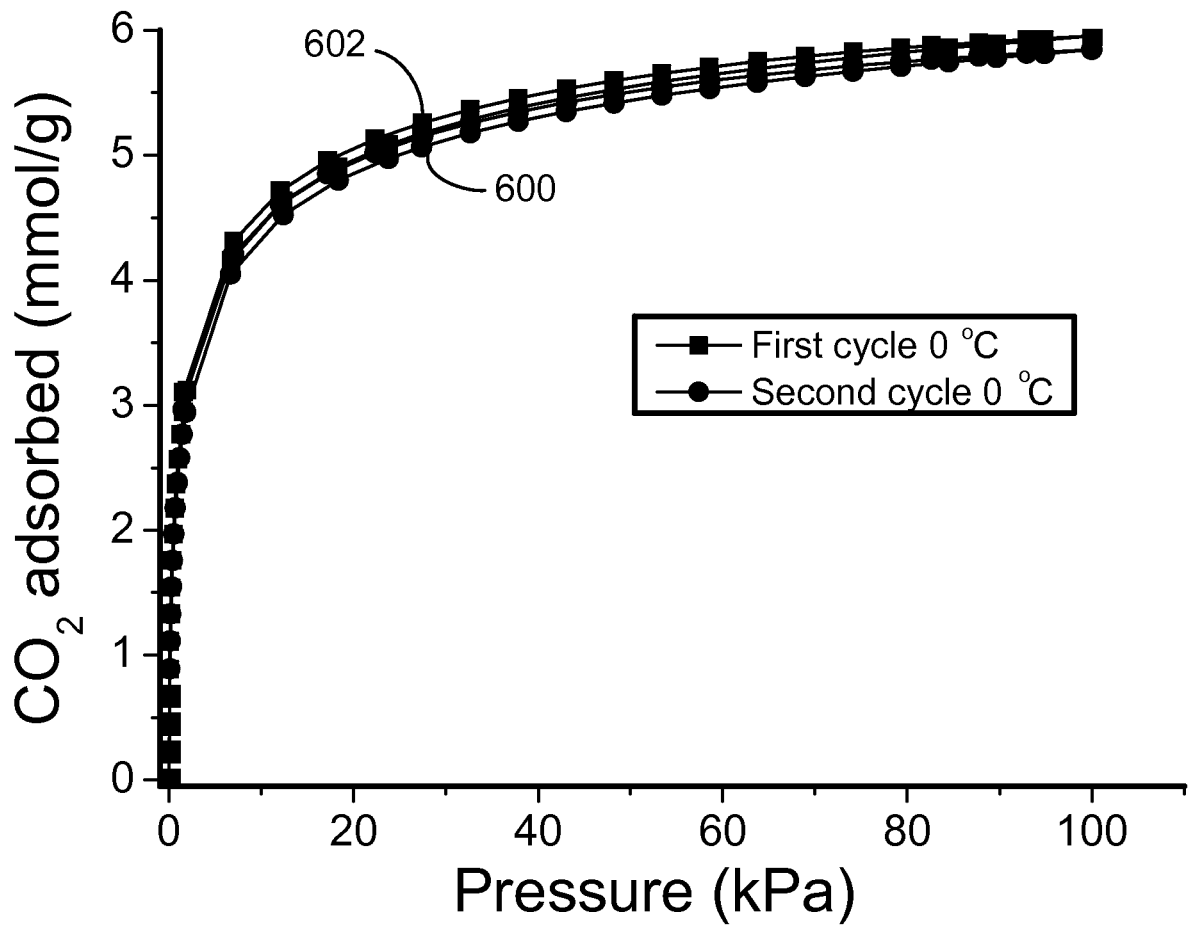
FIG. 6 shows $CO_2$ sorption isotherms for a sample prepared as described in Example 1 in the first two cycles at 0° C.

FIG. 6 shows $CO_2$ sorption isotherms for a sample prepared as described in Example 1 in the first cycle and second cycle at 0° C. in plots 600 and 602, respectively.

Figure 7:
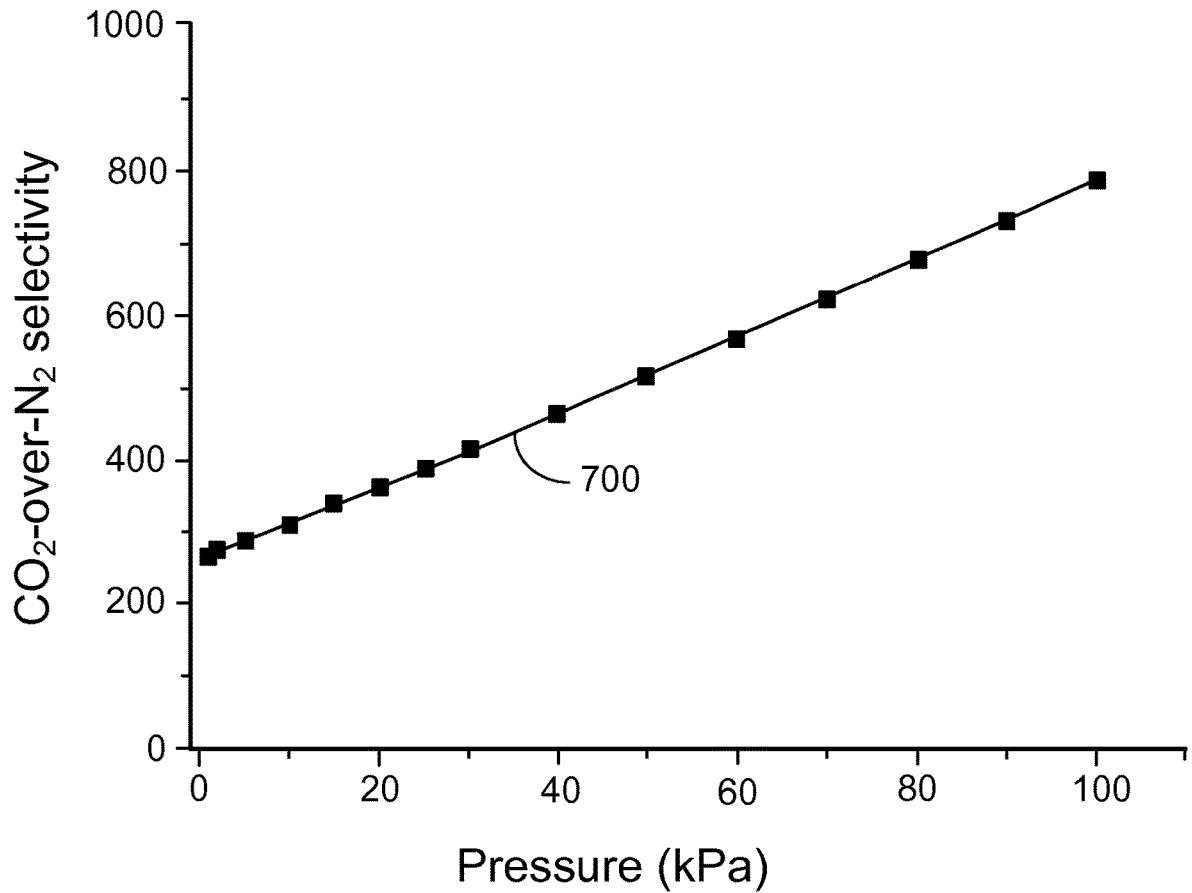
FIG. 7 shows Ideal Adsorbed Solution Theory (IAST) $CO_2$-over-$N_2$ selectivity of the sample prepared as described in Example 1 at 20° C. in a mixture of 15 mol % $CO_2$ and 85 mol % $N_2$.

Plot 700 in FIG. 7 shows IAST $CO_2$-over-$N_2$ selectivity of a sample prepared as described in Example 1 at 20° C. in a mixture of 15 mol % $CO_2$ and 85 mol % $N_2$.

Figure 8:
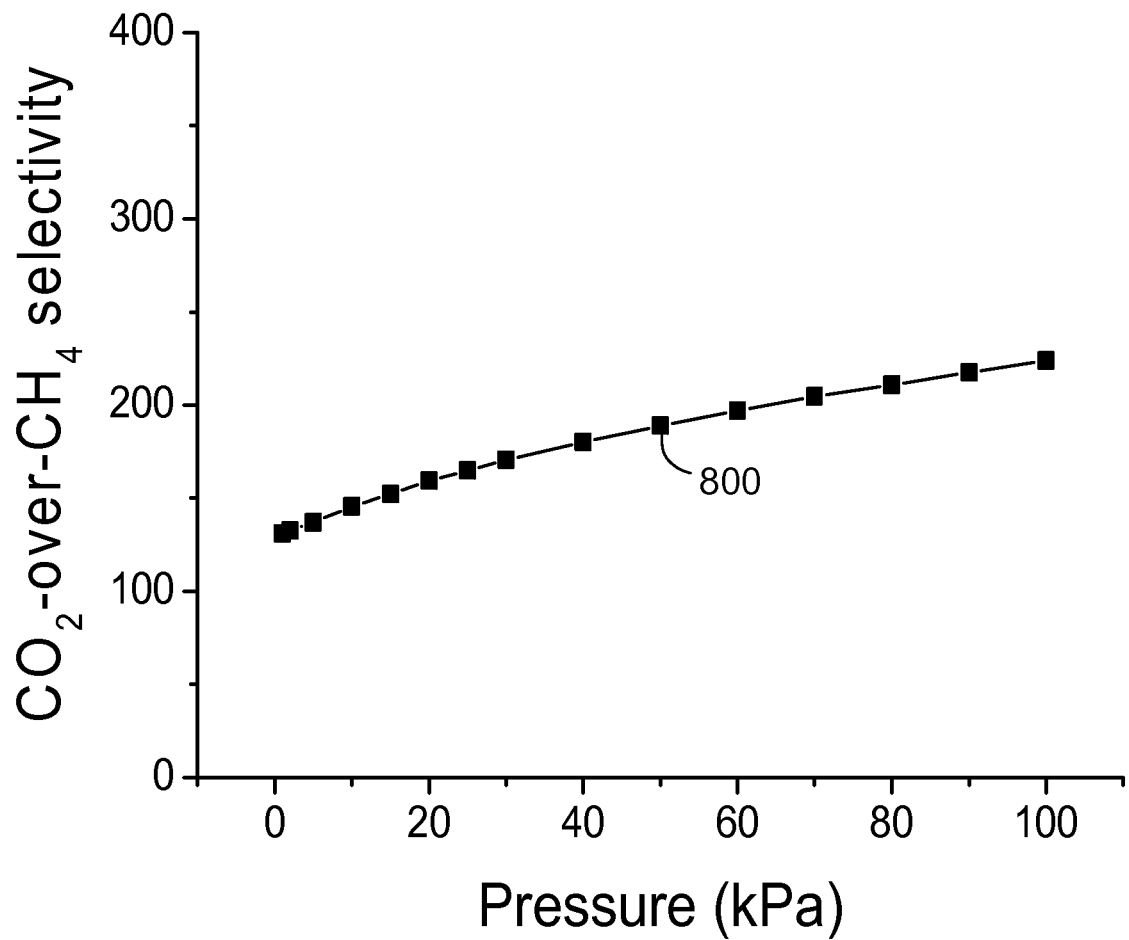
FIG. 8 shows IAST $CO_2$-over-$CH_4$ selectivity of a sample prepared as described in Example 1 at 20° C. in a mixture of 50 mol % $CO_2$ and 50 mol % $CH_4$.

Plot 800 in FIG. 8 shows IAST $CO_2$-over-$CH_4$ selectivity of a sample prepared as described in Example 1 at 20° C. in a mixture of 50 mol % $CO_2$ and 50 mol % $CH_4$.

Figure 9:
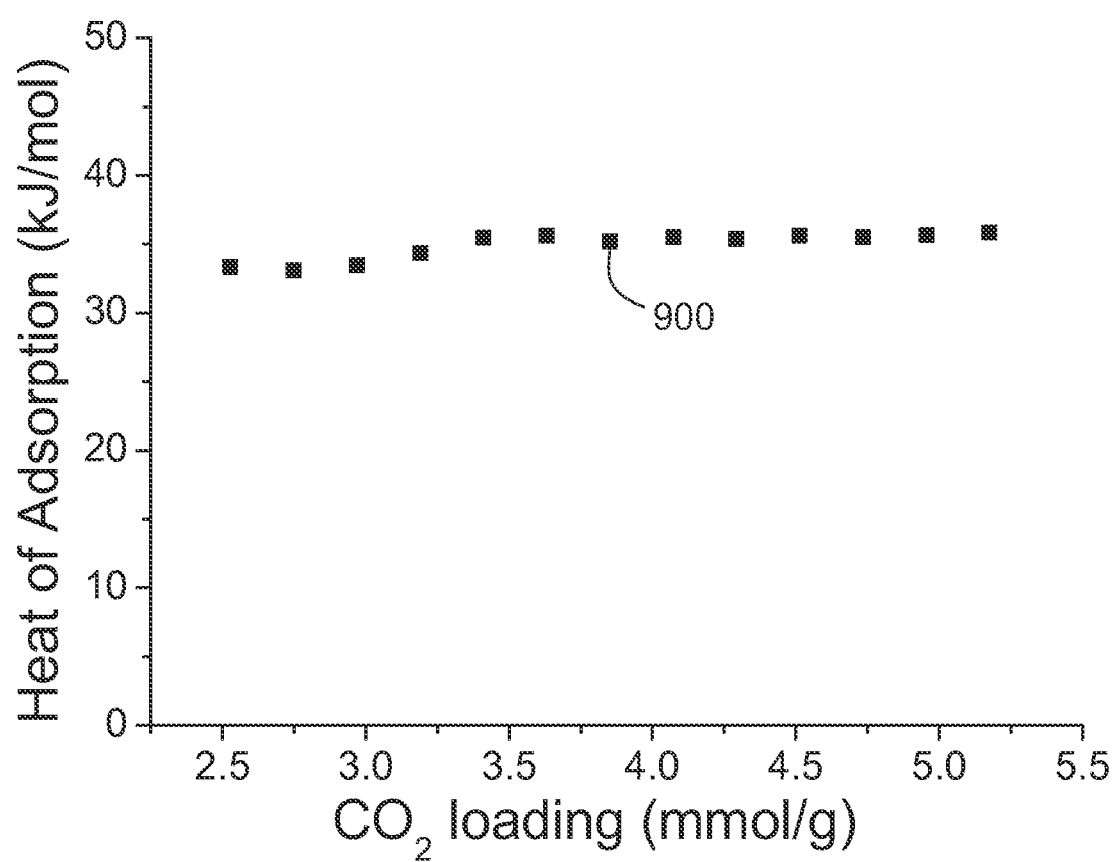
FIG. 9 shows heat of $CO_2$ adsorption of a sample prepared as described in Example 1.

Plot 900 in FIG. 9 shows isosteric heat of $CO_2$ adsorption of a sample prepared as described in Example 1.

Only a few implementations are described and illustrated. Variations, enhancements and improvements of the described implementations and other implementations can be made based on what is described and illustrated in this document.

What is claimed is:

1. A carbon dioxide adsorbent comprising:
   a hierarchical zeolite defining:
   micropores having a pore width between about 0.4 nm and about 2 nm; and
   at least one of:
      mesopores having a pore width between about 2 nm and about 50 nm; and
      macropores having a pore width greater than about 50 nm,
   wherein the hierarchical zeolite comprises:
      anatase; and
      aggregates of crystallites having a faujasite structure, wherein the crystallites are intergrown and have an average size up to about 100 nm, wherein the hierarchical zeolite has a crystallinity of at least about 80% based on the micropore volume of the hierarchical zeolite estimated from gas sorption measurements, and wherein the carbon dioxide adsorbent is formed in the absence of a binder.

2. The carbon dioxide adsorbent of claim 1, wherein the hierarchical zeolite defines mesopores.

3. The carbon dioxide adsorbent of claim 2, wherein the mesopores are textural.

4. The carbon dioxide adsorbent of claim 1, wherein the hierarchical zeolite has a ratio of silicon atoms to aluminum atoms up to about 3.

5. The carbon dioxide adsorbent of claim 1, wherein the hierarchical zeolite is at least partially ion-exchanged with an alkali metal ion, an alkaline earth metal ion, a rare earth metal ion, a transition metal ion, or a combination thereof.

6. The carbon dioxide adsorbent of claim 5, wherein the hierarchical zeolite is at least partially ion-exchanged with lithium, potassium, rubidium, cesium, magnesium, calcium, strontium, barium, or a combination thereof.

7. The carbon dioxide adsorbent of claim 1, wherein the carbon dioxide adsorbent is in the form of a powder, a film, a fiber, granules, beads, pellets, or a coating.

8. The carbon dioxide adsorbent of claim 7, wherein the carbon dioxide adsorbent is in the form of a fiber, and the fiber is hollow.

9. The carbon dioxide adsorbent of claim 7, wherein the carbon dioxide adsorbent is in the form of granules, beads, pellets, or a coating, and the granules, beads, pellets, or coating are formed with or without a binder.

10. A method of forming a carbon dioxide adsorbent, the method comprising:
   heating a composition comprising a geopolymer resin up to about 100° C. to yield a heated composition; and
   separating a solid from the heated composition to yield the carbon dioxide adsorbent,
   wherein the mole fraction of water in the geopolymer resin before heating is up to about 0.85, and
   wherein the carbon dioxide absorbent comprises a hierarchical zeolite defining:
   micropores having a pore width between about 0.4 nm and about 2 nm; and
   at least one of:
   mesopores having a pore width between about 2 nm and about 50 nm; and
   macropores having a pore width greater than about 50 nm,
   wherein the hierarchical zeolite comprises:
   anatase; and
   aggregates of crystallites having a faujasite structure, wherein the crystallites are intergrown and have an average size up to about 100 nm, wherein the hierarchical zeolite has a crystallinity of at least about 80% based on the micropore volume of the hierarchical zeolite estimated from gas sorption measurements, and wherein the carbon dioxide adsorbent is formed in the absence of a binder or with a clay binder.

11. A method of removing carbon dioxide from a gas stream comprising carbon dioxide, the method comprising:
   contacting a first gas stream comprising carbon dioxide with a carbon dioxide adsorbent comprising a hierarchical zeolite; and
   adsorbing carbon dioxide from the first gas stream onto the carbon dioxide adsorbent, thereby removing some of the carbon dioxide from the first gas stream to yield a second gas stream, wherein the second gas stream has a lower concentration of carbon dioxide than the first gas stream,
   wherein the hierarchical zeolite defines:
   micropores having a pore width between about 0.4 nm and about 2 nm; and
   at least one of:
   mesopores having a pore width between about 2 nm and about 50 nm; and
   macropores having a pore width greater than about 50 nm,
   wherein the hierarchical zeolite comprises:
   anatase; and
   aggregates of crystallites having a faujasite structure, wherein the crystallites are intergrown and have an average size up to about 100 nm, and wherein the hierarchical zeolite has a crystallinity of at least about 80% based on the micropore volume of the hierarchical zeolite estimated from gas sorption measurements, and wherein the carbon dioxide adsorbent is formed in the absence of a binder or with a clay binder.

12. A carbon dioxide adsorbent comprising:
a hierarchical zeolite defining:
micropores having a pore width between about 0.4 nm and about 2 nm; and
at least one of:
   mesopores having a pore width between about 2 nm and about 50 nm; and
   macropores having a pore width greater than about 50 nm,
wherein the hierarchical zeolite comprises:
anatase; and
aggregates of crystallites having a faujasite structure, wherein the crystallites are intergrown and have an average size up to about 100 nm, wherein the hierarchical zeolite has a crystallinity of at least about 80% based on the micropore volume of the hierarchical zeolite estimated from gas sorption measurements, and wherein the hierarchical zeolite is shaped with a clay binder.

13. The carbon dioxide adsorbent of claim 1, wherein the hierarchical zeolite has an ideal adsorbed solution theory (IAST) carbon dioxide-over-nitrogen adsorption selectivity of at least about 46 when contacted with a gas mixture comprising about 15 mol % carbon dioxide and about 85 mol % nitrogen at about 20° C. under a total pressure of about 100 kPa.

14. The carbon dioxide adsorbent of claim 13, wherein the hierarchical zeolite has an ideal adsorbed solution theory (IAST) carbon dioxide-over-nitrogen adsorption selectivity of at least about 100 when contacted with a gas mixture comprising about 15 mol % carbon dioxide and about 85 mol % nitrogen at about 20° C. under a total pressure of about 100 kPa.

15. The carbon dioxide adsorbent of claim 14, wherein the hierarchical zeolite has an ideal adsorbed solution theory (IAST) carbon dioxide-over-nitrogen adsorption selectivity of at least about 200 when contacted with a gas mixture comprising about 15 mol % carbon dioxide and about 85 mol % nitrogen at about 20° C. under a total pressure of about 100 kPa.

16. The carbon dioxide adsorbent of claim 15, wherein the hierarchical zeolite has an ideal adsorbed solution theory (IAST) carbon dioxide-over-nitrogen adsorption selectivity of at least about 400 when contacted with a gas mixture comprising about 15 mol % carbon dioxide and about 85 mol % nitrogen at about 20° C. under a total pressure of about 100 kPa.

17. The carbon dioxide adsorbent of claim 12, wherein the hierarchical zeolite has an ideal adsorbed solution theory (IAST) carbon dioxide-over-nitrogen adsorption selectivity of at least about 46 when contacted with a gas mixture comprising about 15 mol % carbon dioxide and about 85 mol % nitrogen at about 20° C. under a total pressure of about 100 kPa.

18. The carbon dioxide adsorbent of claim 17, wherein the hierarchical zeolite has an ideal adsorbed solution theory (IAST) carbon dioxide-over-nitrogen adsorption selectivity of at least about 100 when contacted with a gas mixture comprising about 15 mol % carbon dioxide and about 85 mol % nitrogen at about 20° C. under a total pressure of about 100 kPa.

19. The carbon dioxide adsorbent of claim 18, wherein the hierarchical zeolite has an ideal adsorbed solution theory (IAST) carbon dioxide-over-nitrogen adsorption selectivity of at least about 200 when contacted with a gas mixture comprising about 15 mol % carbon dioxide and about 85 mol % nitrogen at about 20° C. under a total pressure of about 100 kPa.

20. The carbon dioxide adsorbent of claim 19, wherein the hierarchical zeolite has an ideal adsorbed solution theory (IAST) carbon dioxide-over-nitrogen adsorption selectivity of at least about 400 when contacted with a gas mixture comprising about 15 mol % carbon dioxide and about 85 mol % nitrogen at about 20° C. under a total pressure of about 100 kPa.

* * * * *